(12) United States Patent
Livermore-Clifford et al.

(10) Patent No.: US 9,546,743 B2
(45) Date of Patent: Jan. 17, 2017

(54) SEALABLE MICROVALVE THAT CAN BE REPEATEDLY OPENED AND SEALED

(71) Applicant: Northeastern University, Boston, MA (US)

(72) Inventors: Carol Livermore-Clifford, Framingham, MA (US); Chenye Yang, Malden, MA (US)

(73) Assignee: Northeastern University, Boston, MA (US)

(\*) Notice: Subject to any disclaimer, the term of this patent is extended or adjusted under 35 U.S.C. 154(b) by 328 days.

(21) Appl. No.: 14/455,302

(22) Filed: Aug. 8, 2014

(65) Prior Publication Data

US 2015/0300526 A1    Oct. 22, 2015

Related U.S. Application Data

(63) Continuation of application No. PCT/US2013/025176, filed on Feb. 7, 2013.

(60) Provisional application No. 61/597,436, filed on Feb. 10, 2012.

(51) Int. Cl.
    *F16K 99/00*    (2006.01)

(52) U.S. Cl.
    CPC ....... *F16K 99/0009* (2013.01); *F16K 99/0032* (2013.01); *F16K 99/0044* (2013.01); *F16K 99/0046* (2013.01); *F16K 99/0048* (2013.01); *F16K 99/0051* (2013.01); *F16K 2099/008* (2013.01); *F16K 2099/0069* (2013.01); *F16K 2099/0074* (2013.01)

(58) Field of Classification Search
    CPC ............. F16K 99/0009; F16K 99/0046; F16K 99/0051; F16K 99/0032; F16K 99/0048; F16K 99/0044

USPC ....... 251/129.01, 11; 137/828, 829, 831, 76; 422/502, 537, 417
See application file for complete search history.

(56) References Cited

U.S. PATENT DOCUMENTS

| 4,005,920 A | 2/1977 | Wimmer |
| 4,328,289 A | 5/1982 | Zupancic et al. |
| 4,872,606 A | 10/1989 | Satoh et al. |
| 5,069,419 A | 12/1991 | Jerman |

(Continued)

OTHER PUBLICATIONS

International Search Report and Written Opinion issued by the U.S. Patent and Trademark Office as International Searching Authority for International Application No. PCT/US2013/025176 mailed Apr. 9, 2013 (9 pgs.).

(Continued)

*Primary Examiner* — Craig Schneider
*Assistant Examiner* — Nicole Wentlandt
(74) *Attorney, Agent, or Firm* — Foley Hoag LLP; Rajesh Vallabh

(57) ABSTRACT

A substantially leak-free, sealable microvalve that can be repeatedly opened and sealed is presented. The resealable microvalve includes a block with a through via and a sealing plate. The gap between the block and the sealing plate is sealed by a sealing material. The sealing material can be melted when heat is applied and can be solidified when heat is absent. To close the resealable microvalve, heat is applied by flowing a current through a resistive heater and an actuator brings the block and the sealing plate into a contacting position. By removing the heat, the sealing material is solidified and creates a sealed state. To open the resealable microvalve, heat is applied to the sealing material. When the sealing material melts, the actuator moves the block and the sealing plate into a spaced apart position.

19 Claims, 17 Drawing Sheets

(56) References Cited

U.S. PATENT DOCUMENTS

| | | |
|---|---|---|
| 5,449,569 A | 9/1995 | Schumm, Jr. |
| 5,863,801 A | 1/1999 | Southgate et al. |
| 6,050,435 A | 4/2000 | Bush et al. |
| 6,527,003 B1 | 3/2003 | Webster |
| 6,812,820 B1 | 11/2004 | Fouillet |

OTHER PUBLICATIONS

Manginell, et al., "A Materials Investigation of a Phase-Change Micro-Valve for Greenhouse Gas Collection and Other Potential Applications," Rev. Sci. Instrum., vol. 83, pp. 031301-1-031301-11 (2012).

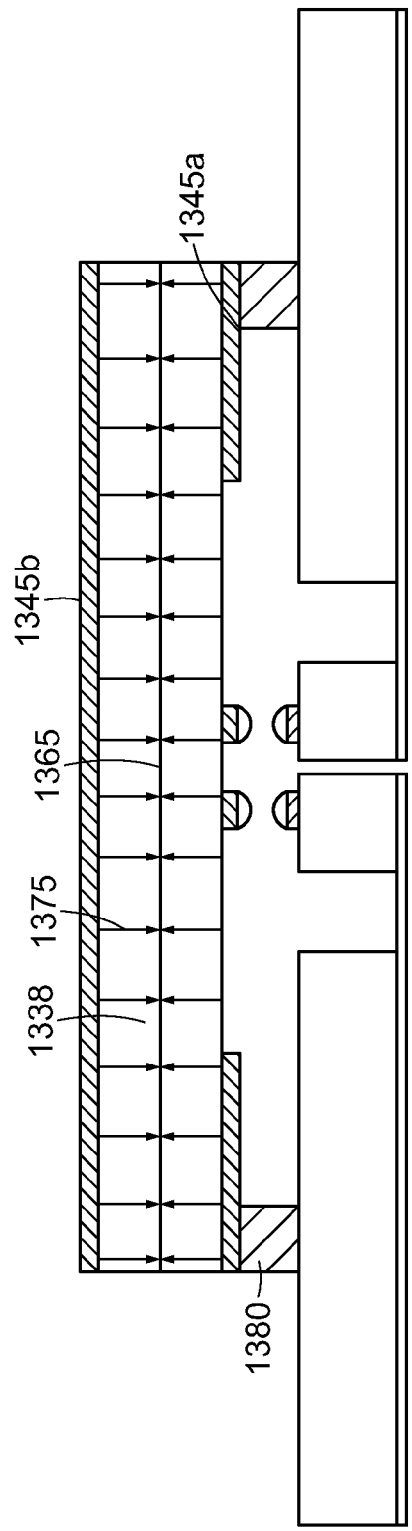
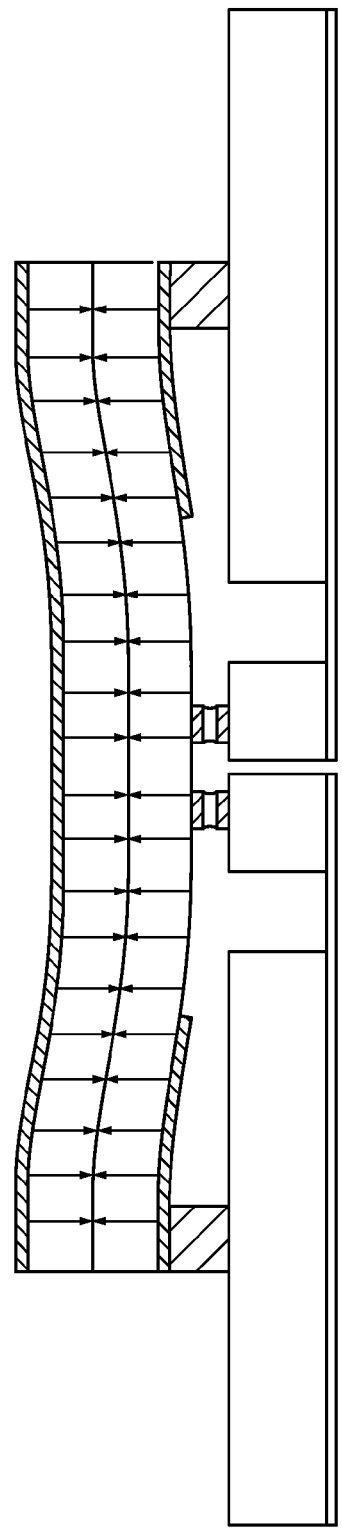
FIG. 13A
FIG. 13B

SEALABLE MICROVALVE THAT CAN BE REPEATEDLY OPENED AND SEALED

CROSS-REFERENCE TO RELATED APPLICATIONS

This application is a continuation of International Application No. PCT/US2013/025176, filed Feb. 7, 2013, which claims priority to U.S. Provisional Application Ser. No. 61/597,436, filed Feb. 10, 2012, each of which are hereby incorporated by reference in their entireties.

SPONSORSHIP INFORMATION

This invention was made with government support under Grant No. W911QY-05-1-0002 awarded by DARPA. The government has certain rights in this invention.

BACKGROUND OF THE INVENTION

The present disclosure relates to the field of microvalves, specifically to a microvalve that can be repeatedly opened and sealed.

A typical structure for a Micro Electro Mechanical System (MEMS) microvalve includes an orifice and a moveable plate that can be actuated to press against the orifice. When the plate does not press against the orifice, fluid can flow through the orifice and therefore through the valve. When the plate is pressed against the orifice, fluid flow through the valve is restricted. Although the flow is restricted, this type of microvalve does not seal fully, and some flow continues through the orifice. The ratio of open flow rate to closed flow rate for valves that have a flow rate when open of at least 1 standard centimeter cubed per minute (sccm) is typically up to about 10,000. This does not provide adequate sealing for long periods of time.

There are valves that provide a substantially leak-free seal; however, the seal of these valves are permanent. A closed valve, which is sealed by solidifying a sealing material, may be opened by melting the sealing material. However, when the sealing material melts, the sealing material drains away, not allowing the valve to be reused without adding more sealing material.

In many of the applications, it may be desirable to use a valve that can be repeatedly opened and closed and can provide a substantially leak-free seal in the closed state and a relatively high flow rate in the open state.

SUMMARY OF THE INVENTION

A sealable microvalve that can be repeatedly opened and sealed is provided. In accordance with embodiments of the invention, a resealable microvalve is disclosed. The microvalve includes first and second plates in facing relationship. At least one of the first and second plates is capable of movement from a first spaced apart position to a second contacting position. The first plate includes a through via. The microvalve also includes a first wetting element disposed on the first plate and surrounding the through via, a second wetting element disposed on the second plate in facing relationship with the first wetting element, and a sealing material disposed on one or both of the first and second wetting elements. The sealing material is capable of reversible melt and solidification and of wetting the first and second wetting elements when in a molten state. The microvalve further includes a heating element in thermal communication with the sealing material, wherein the heating element is positioned on at least one of the first and second plates. At least one of the first and second plates is supported on a leak-proof structure. A surface of the first plate surrounding the first wetting element has a non-wetting interaction with the sealing material and a surface of the second plate surrounding the second wetting element has a non-wetting interaction with the sealing material.

In accordance with other embodiments of the invention, the heating element comprises a resistive heater. The first plate of the microvalve may be supported on a thermally insulating membrane. In another embodiment, the first plate is at least partially surrounded by a thermal insulator. The thermal insulator may be air or a thermally insulating material.

In yet another embodiment, the microvalve may further include an actuator for moving the first and second plates between the first spaced apart position and the second contacting position. The actuator may be piezoelectric, electromagnetic, electrostatic, or thermopneumatic. The piezoelectric actuator may include electrodes covering a portion of the actuator. The actuator may be supported on thermally insulating tethers.

Various embodiments of the microvalve are presented. In an embodiment, an actuator is coupled to the second plate and the heating element is placed on a surface of the first plate. The first plate may be comprised of a thermally conducting material. In other embodiments, the second plate of the microvalve is supported on a thermally insulating membrane. The second plate may be at least partially surrounded by a thermal insulator. The thermal insulator may be air or a thermally insulating material. In other embodiments of the invention, the first plate may be supported on a thermally insulating membrane and the actuator may be coupled to the thermally insulating membrane. The actuator may be coupled to the first plate and the heating element is placed on a surface of the first plate. In alternative embodiments of the invention, the second plate is a thermally insulating membrane.

In other embodiments, the microvalve includes first and second frames supporting the first and second plates. The microvalve also includes a connector coupling the first and second frames.

A method of sealing a resealable microvalve is also disclosed. The method includes providing a resealable microvalve, heating the sealing material to melt the sealing material, and moving the first and second plates from a first spaced apart position to a second contacting position. The molten sealing material wets the surfaces of the first and second wetting elements to form a molten seal. The method further includes cooling the molten seal to resolidify the sealing material and forming a gas-tight seal.

BRIEF DESCRIPTION OF THE DRAWINGS

FIG. 13A shows a cross-sectional view of an open resealable valve, containing x-poled piezoelectric actuators with partially actuating tethers in accordance with embodiments. FIG. 13B shows a cross-sectional view of the resealable valve in its closed state in accordance with embodiments.

DETAILED DESCRIPTION OF THE INVENTION

A resealable valve that is substantially leak-free is provided in accordance with embodiments of the present invention. The resealable valve has two states: an open state and a closed state (or sealed state). In an open state, the resealable valve allows fluid flow through its through via or open passageway. In a closed state, the through via of the microvalve is sealed with a sealing plate and a sealing material. The sealing material seals the gap between the sealing plate and the through via to form an air-tight or hermetic seal when the valve is in a closed state. By air-tight or hermetic seal it is meant that the flow rate of gas or liquid is very low.

To transition from an open state to a closed state, heat is applied to the sealing material to melt the material. Then, an actuator brings the sealing plate and the structure with the through via into contact with each other, where the liquefied sealing material wets the sealing plate. The sealing material is then solidified by stopping or reducing the application of heat to the sealing material. To transition from a closed state to an open state, the same steps are applied. However, this time the actuator moves the sealing plate and the structure with the through via away from each other. The surface of the sealing plate and the structure with the through via are selected so that the liquid sealing material forms a liquid island on the structure rather than flowing. In this way, the sealing material remains at the seal and is available for subsequent sealing/unsealing operations.

Such a resealable microvalve can be useful in vacuum applications or to seal in the contents of a closed space and to prevent entry into that space by molecules or atoms from outside the closed space.

Figure 1:
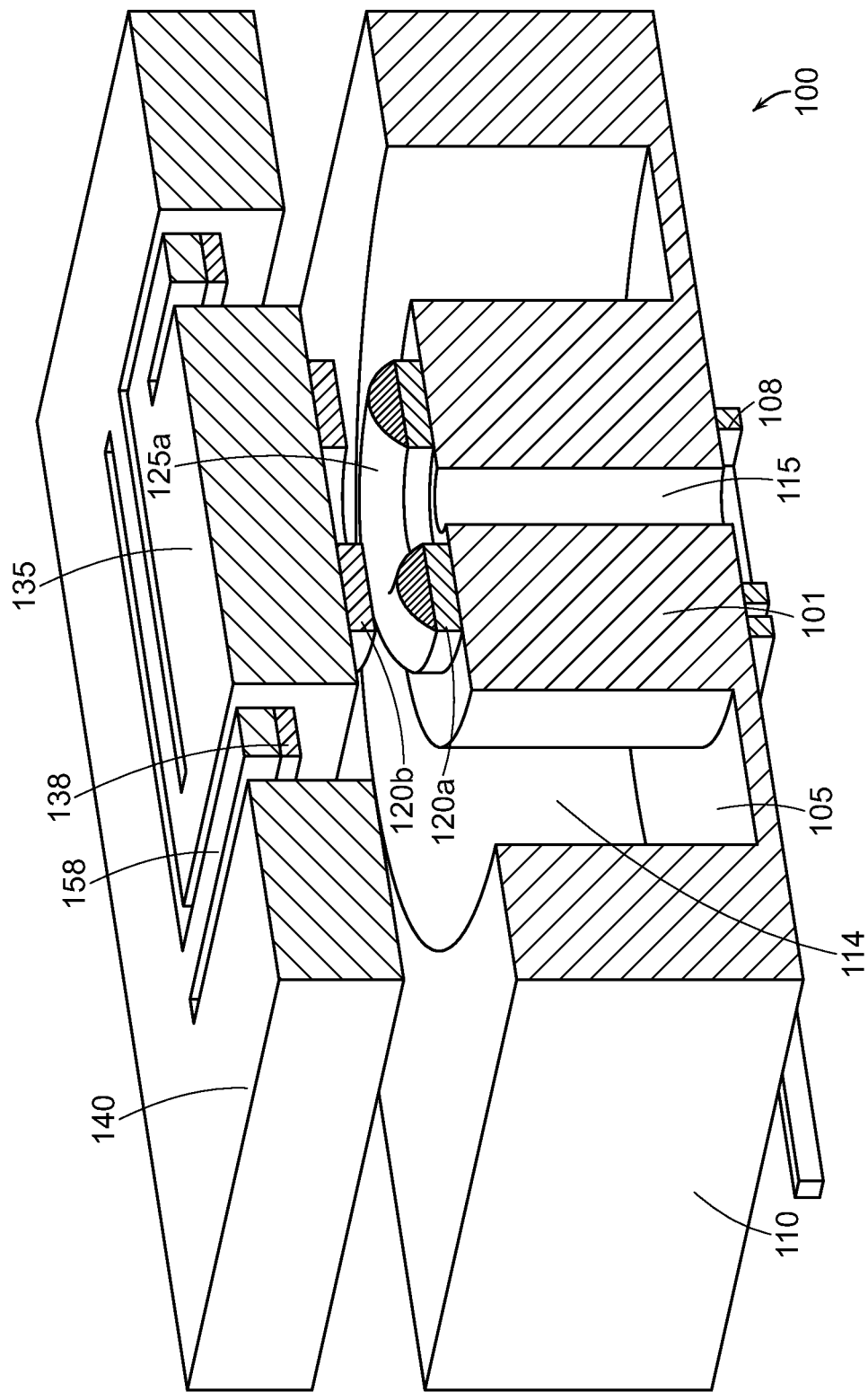
FIG. 1 shows a 3D cross-sectional view of a resealable valve in accordance with embodiments of the present invention.
Figure 3:
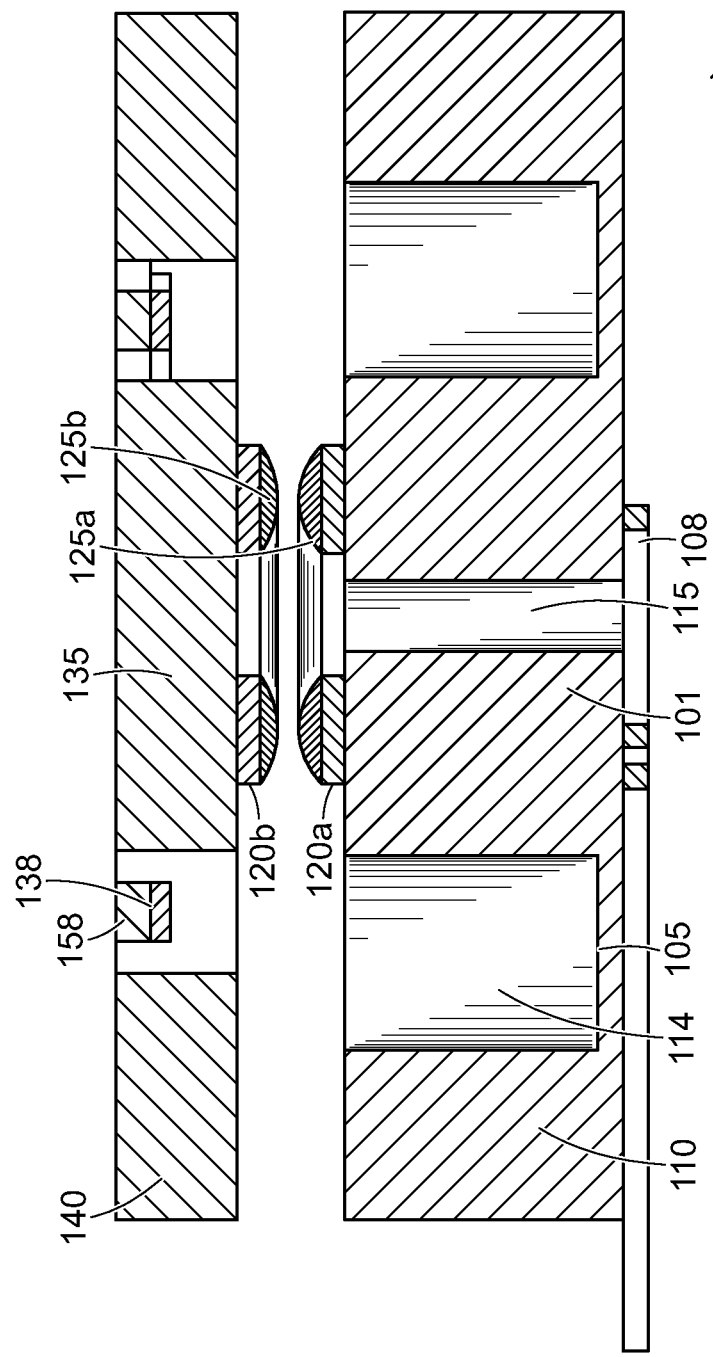
FIG. 3 shows a 2D cross-sectional side view of a resealable valve in accordance with embodiments of the present invention.

FIG. 1 shows a cross-sectional view of a resealable valve in accordance with embodiments of the present invention. A resealable valve 100 includes a block 101 with a through via 115. In an embodiment, the through via 115 is located in the center of block 101. Block 101 may be supported on a membrane 105, which is connected to a lower frame 110. The resealable valve also includes a sealing plate 135 that is positioned in facing relationship with block 101. FIG. 3 is a cross-sectional view of the resealable valve depicting the facing relationship of block 101 and sealing plate 135.

On one side of block 101, through via 115 is surrounded by a wetting element 120a. A sealing material 125 is disposed on the wetting element 120a. As is discussed in greater detail below, wetting element 120a can be a continuous layer that surrounds or substantially surrounds through via 115. Sealing material 125 is a low melting solid disposed on wetting element 120a. On the opposite side of block 101, a heater 108 for providing heat to sealing material 125 is located. The heater sits below membrane 105, on which the block is supported.

Sealing plate 135 also includes a wetting element 120b, which can be made of the same or different material as wetting element 120a and can be in the same or different shape as wetting element 120a. The wetting element 120b faces the wetting element 120a of the block 111. The sealing plate 135 may be supported on tethers 158, connected to an upper frame 140. The tethers may include actuators 138 for moving sealing plate 135 towards and away from block 101 in a repeatable and reversible manner.

Block 101 is made of a thermally-conductive material so that heat from heater 108 can be transferred to sealing material 125. In certain embodiments, frame 110 and block 101 can be made of silicon. Silicon provides ease of manufacturing, for example by deep reactive ion etching or KOH etching. However, frame 110 and block 101 may also be made using any suitable material including but not limited to silicon carbide, glass, or metal. In certain embodiments, block 101 is spaced apart from frame 110 to provide, for example, a space 114. Space 114 provides an insulating gap between the thermally conductive block and the frame, which can be advantageous, for example, to prevent heating of adjacent elements. In other embodiments, space 114 can include an insulating material, such as silica, rubber, a polymer, or a gel.

In accordance with some embodiments of the present invention, the diameter of block 101 is between 2 mm and 3 mm. Frame 110 can have an inner diameter between 2.5 mm and 4 mm. The diameter of through via 115 can be in the range of 50 micrometers to about 1 mm in some embodiments of the present invention. The height of the frame and the block mostly depends on the manufacturing process. For a silicon manufacturing process, it may be convenient to have a height between 400 to 1000 micrometers. However, a different dimension may be chosen with another manufacturing process.

In certain embodiments, membrane 105 is made of a thermally-insulating material, which membrane 105 limits transfer of heat. The heat generated from heater 108 is transferred to sealing material 125 with less propagation to other directions. Because of reduced heat loss, smaller amount of input power is needed for heater 108. Space 114 created by membrane 105 between block 101 and lower frame 110 may be filled with air or a thermally insulating material to further limit heat loss and promote heat propagation to the sealing member.

Membrane 105 can be made of silicon nitride or a multi-layer structure of silicon nitride and silicon oxide. Alternatively, membrane 105 may be made of other materials that provide adequate strength and thermal isolation for melting of the sealing material. Examples of such materials include silicon, metals, semiconductors, and dielectrics.

As discussed in greater detail below, block 101 and sealing plate 135 can be moved into close facing relationship with one another. See also FIG. 3. Once brought into a close facing relationship, the resealable microvalve relies on the surface tension of a molten sealing material and its wetting of the wetting elements to establish a leak-free seal over the through via. See e.g., FIG. 7. In embodiments of the present invention, the sealing material is heated to form a liquid, which wets wetting elements 120a, 120b and flows around the through via 115 to seal the gap between sealing plate 135 and block 101. The wetting between the molten sealing material and the wetting elements allows sealing material 125 to surround the entire through via 115.

The geometry of the sealing ring (wetting element) is selected to enable the melted seal material to be separated when the piezoelectric actuators are moved by less than or equal to their maximum deflection distance. In exemplary embodiments, therefore, the wetting element has a sealing ring geometry with an inner radius of 350 micrometers and an outer radius of 500 micrometers, though many other sets of dimensions are possible. In some embodiments, the height of the wetting elements is about 30 micrometers. The minimum amount of seal material can be used that still enables the ring to be coated with sealing material along its whole length, so that the through via is completely surrounded by seal material and the valve closes completely.

The surface tension may not be too high. Higher surface tension requires greater force to open the valve, and an actuator, e.g., an actuator based on manufacturing of microscale features, may not provide the adequate strength. Also, providing too much power to open the valve may break membrane 105, rather than separating block 101 and sealing plate 135. The adequate level of surface tension may be different for different materials used for the valve.

Some of the suitable materials for seal 125 are indium, indium bismuth alloy, and tin lead because of its low melting point (which allows it to melt with a small temperature rise) and its low vapor pressure (which helps prevent outgassing from the seal). However, other sealing materials may be used, such as other solders or thermoplastic polymers.

The sealing material can wet wetting element 120a on block 101 and wetting element 120b on sealing plate 135, that is sealing material 125 can make contact with the wetting elements and can stay on the wetting elements. The wetting elements can, for example, be made of nickel. The sealing material may not have a wetting interaction with the surrounding substrate, as this provides a barrier to flow of the molten sealing material beyond the wetting elements. In other words, the interaction with the surrounding substrate should be non-wetting for optimal, robust performance. By providing a wetting surface for preferential wetting by the molten sealing material proscribed by a non-wetting region that disfavors wetting, the molten sealing material does not spread out or flow beyond a sealing zone around the through via. The localization of the sealing material upon melting provides a resealable valve having a seal geometry that remains in place with repeated heating cycles.

The terms wetting and non-wetting are relatively defined. The term non-wetting is defined to mean having a smaller relative wettability than the term wetting. Therefore, the sealing material has a relatively higher wettability with the wetting material than with the non-wetting surrounding substrate. The wettability can be determined by the contact angle, where the wettability and the contact angle have an inverse relationship. Thus, the contact angle between the sealing material and the wetting elements is smaller than the contact angle between the sealing material and the surrounding substrate.

Figure 6:
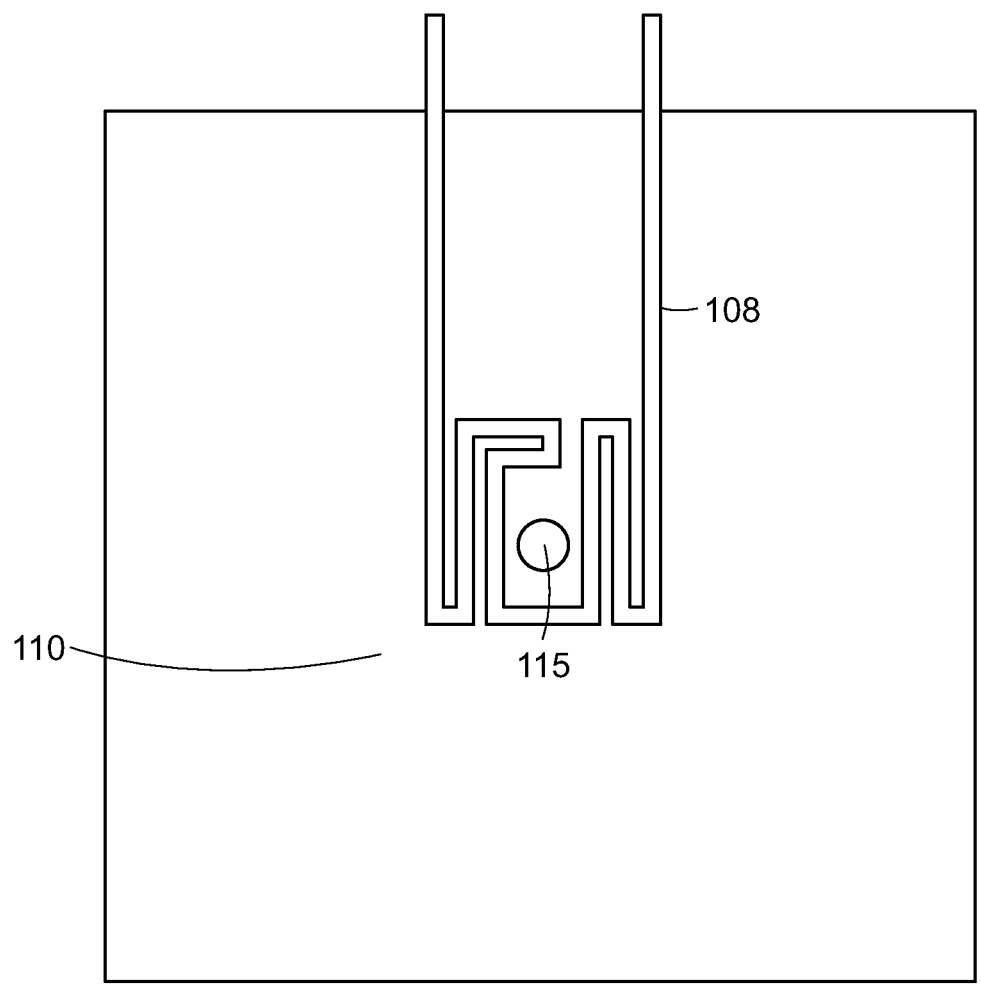
FIG. 6 shows a heater placed around a through via on a block in accordance with embodiments of the present invention.

In some embodiments, the heater 108 is a resistive heater. FIG. 6 shows a bottom view of a block with a through via. A through via 115 is located at the center of a block 101 and a heater 108 is disposed on block 101. The pattern of heater 108 can vary. Heater 108 can be localized on the bottom of the block 101 as shown in FIG. 6. The pattern of the resistive heater 108 showing in FIG. 6 is for illustration only. The heater may have a different pattern with a different complexity. Having heater 108 surrounding through via 115 locates the heater directly under the sealing material for effective heat transfer. Heater 108 is in serial connection (i.e., electricity flows from one end to another end), but the heater may have a parallel connection to ensure that heat is generated even when a portion of the circuit is open.

A range of materials may be used to create the resistive heater, including but not limited to gold, nickel, other metals, and polysilicon. Although shown in FIG. 1 as located on the lower face of block 101, a heater can also be located on sealing plate 135 or both locations. The specific location is not critical, as the sealing material will heat up on both wetting surfaces during use. While the current embodiment is described using a resistive heater, it will be apparent that other heaters can also be used.

Figure 4:
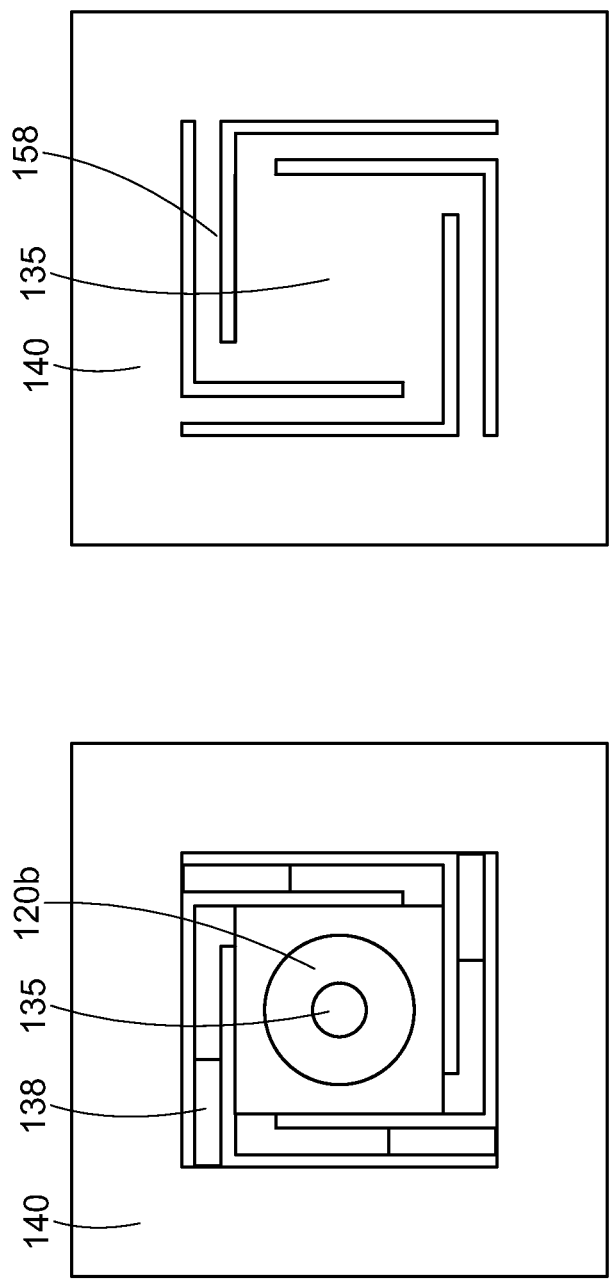
FIG. 4A shows a bottom view of a sealing plate supported on tethers with integrated actuators in accordance with embodiments of the present invention.
FIG. 4B shows a top view of a sealing plate in accordance with embodiments of the present invention.

Similar to membrane 105, tethers 158 may be thermally insulating to prevent lateral heat loss. As shown in FIG. 1, tethers 158 are spanning bars that join the sealing plate 135 to frame 140. In certain embodiments, the tethers are integral with the frame and sealing plane. FIG. 1 shows the resealable microvalve with four tethers. However, the number of tethers is not limited to four; it can be larger than or less than four. Tethers 158 can be equipped with actuators 138. FIGS. 4A and 4B show top and bottom plan views of the sealing plate, integral tethers and frame. Viewed from below in FIG. 4A, the location of actuators 138 on tethers 158 is shown. Actuators may be located over portions of the tethers or over the entire tethers. Actuators may be located above or below the tethers. In some embodiments, actuators and tethers are the same elements. A ring of sealing material 125 disposed on wetting seal 120b (not shown) is also shown. Viewed from above in FIG. 4B, the tethers are arranged to align with a side of the central sealing plate and are secured to the sealing plate at one end and to the frame at the other end. The arrangement allows each tether to deflect in a downward motion. When actuated at the same time, the tethers lower the sealing plate towards the block housing the via while remaining substantially parallel to the block.

Figure 5:
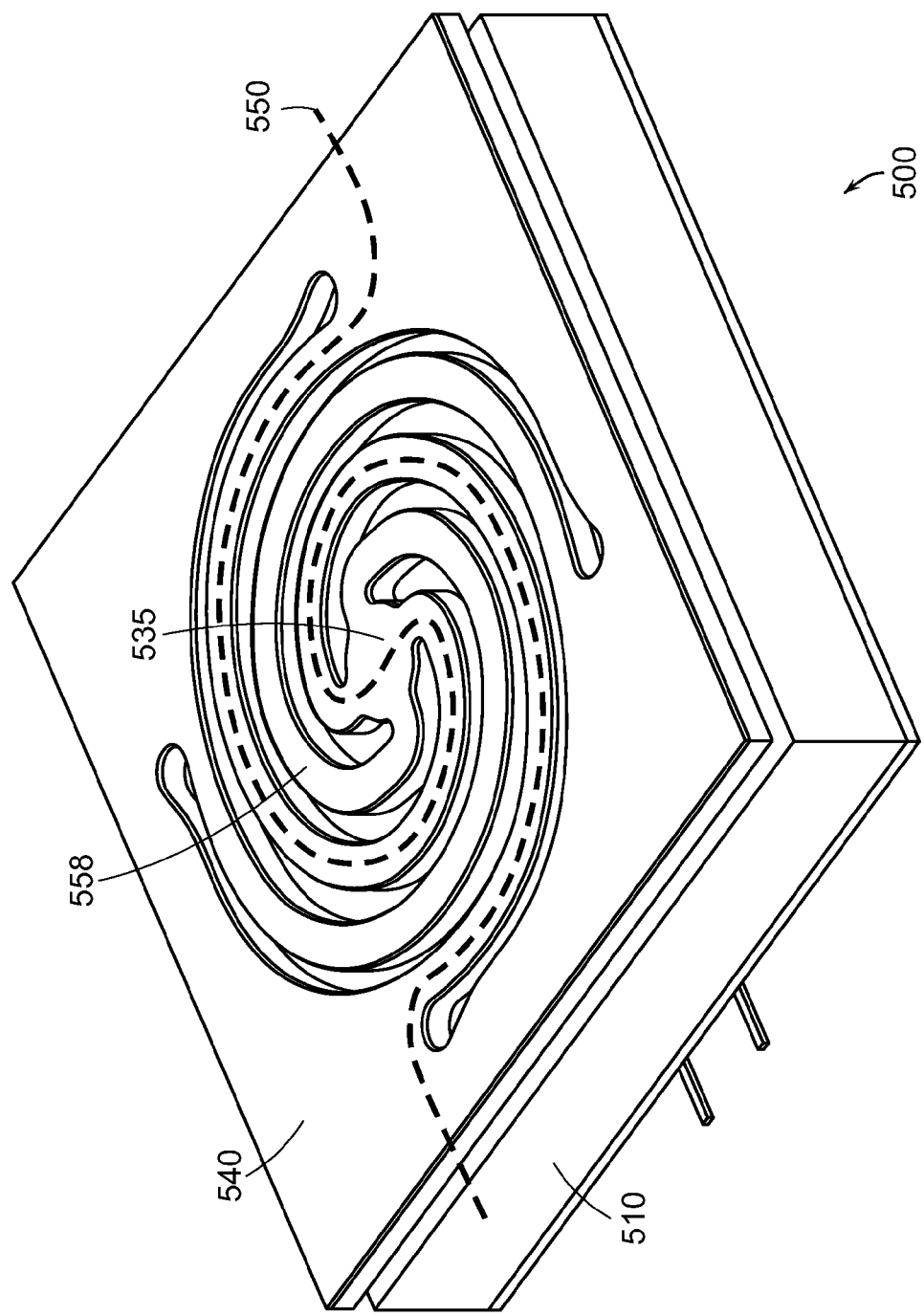
FIG. 5 shows a sealing plate supported on circular tethers in accordance with embodiments of the present invention.

FIG. 5 shows a resealable microvalve 500 with an alternative tether structure. In this embodiment, a sealing plate 535 is supported on circular tethers 558. However, the structure of tethers is not limited to a circular or linear shape. The circular tethers 558 are connected to an upper frame 540. Under the upper frame, there is a lower frame 510. The dashed line 550 is drawn for an illustrational purpose to show a cross-sectional side view in FIG. 13-16.

There are many material choices and multiple manufacturing options that can be used to create tethers 158 and actuators 138. In one embodiment, techniques such as lithography, laser writing and thin film deposition commonly used in MEMS manufacturing can be employed.

The actuators 138 may be piezoelectric actuators (cantilever benders, plate benders, or piezo stacks). Suitable electrical contacts (not shown) are used to provide actuation potential. In certain embodiments of the resealable valve, the actuators that both drive the sealing plate into contact with the first island (or block) in order to seal off flow and drive the sealing plate out of contact with the first island (or block) in order to re-open flow are piezoelectric bending actuators. These actuators can be secured to the tethers that connect the moveable second island (or sealing plate) to the fixed frame that supports them.

A suitable material for a piezoelectric actuator is lead zirconate titanate (PZT), but other materials such as quartz, aluminum nitride, polyvinylidene fluoride (PVDF), or any other material that provides appropriate actuation may be used. In one embodiment, the piezoelectric actuating element is a bimorph of lead zirconate titanate (PZT), poled either in parallel or in series and actuated with voltages such that it acts as a fixed-guided beam rather than as a cantilever beam.

Other actuators of any other type (electromagnetic, electrostatic, thermopneumatic, thermal, etc.) are also contemplated. Alternate materials and manufacturing processes available to one of skill in the art may be employed if different actuation techniques are chosen. For example, electromagnetic actuation would require a permanent magnet or magnets and a metal coil or coils. Thermopneumatic actuation would require a liquid or gas phase expansion material. Thermal actuation can require other materials such as shape memory alloys.

In an alternative embodiment, the entire upper frame 140, tethers 135 and sealing plate 131 may be made from a piezoelectric material. Although the detailed dimensions can vary, in an exemplary embodiment, the piezoelectric actuators have a length of about 22 millimeters, a width of about 2 millimeters, and a thickness of about 200 micrometers. The maximum deflection of a piezoelectric element with this geometry that is actuated by 250 Volts is greater than 120 micrometers, sufficient to open the valve described here.

An exemplary dimension for the elements of the resealable microvalve is provided. In an embodiment, the through via has a radius of less than 290 micrometers. The radius of the block is 1.0 mm, and the outer radius of the membrane is 1.4 mm. The membrane thickness is about 2-3 micrometers. The actuated sealing plate has a radius of 1 mm, and the sealing plate has a thickness of 0.2 mm.

In other embodiments, some portions or the entire portions of actuators, sealing plate, and upper frame are prepared from a sheet of piezoelectric material, e.g., a bilayer sheet of PZT, which is then secured or laminated onto a silicon frame. See, e.g., FIG. 11. In yet another embodiment, the actuator is printed, e.g., screen printed, onto a silicon plate into which the sealing plate, tethers and frame have been cut.

Figure 2:
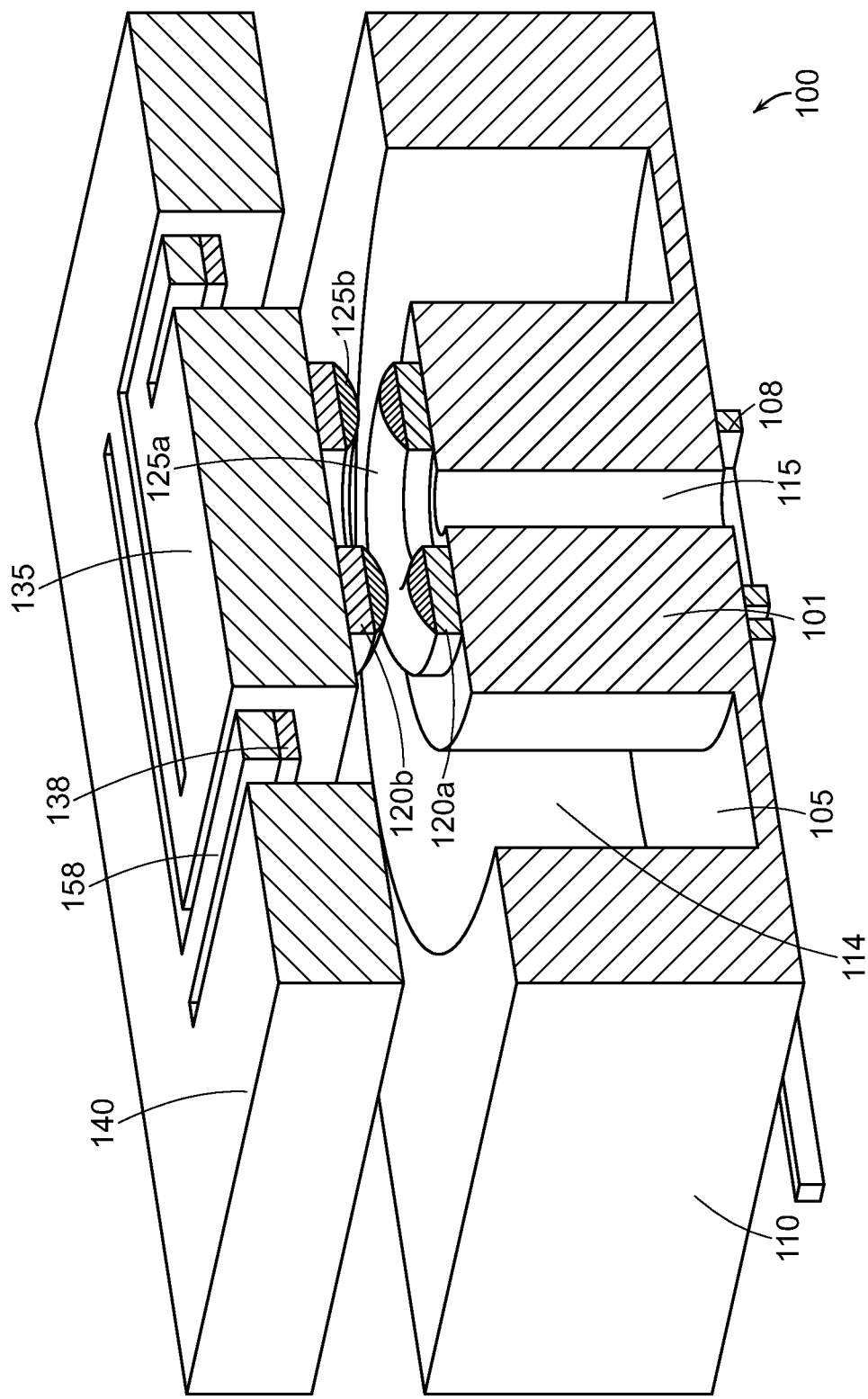
FIG. 2 shows a 3D cross-sectional view of a resealable valve that has sealing material on both a block with a through via and a sealing plate in accordance with embodiments of the present invention.

FIG. 2 shows a 3D cross-sectional view of resealable valve 100 with the sealing material 225a and 225b on both the block 101 and the sealing plate 135. It is possible to have the sealing material on one or on both elements before the initial usage. After using the valve (i.e., having the valve closed and reopened), the sealing material will be on both the block 101 and the sealing plate 135 as shown in FIG. 2. Alternatively, the sealing material can be applied to both setting elements 120a and 120b prior to use.

There are three system requirements for the sealing valves that can be repeatedly opened and sealed for microsystems. First, the flow resistance of the open valve should be low enough that it does not impede the operation of the rest of the system. Second, the size of the valve should be consistent with microsystem size scales (about 1 mm$^3$–1 cm$^3$). Third, the flow resistance of the closed valve should be extremely high (essentially leak-free). For example, the flow rate should be less than $10^{-9}$ sccm.

Manufacturing Process

The resealable microvalve could be made by MEMS technology, conventional means, or in combination of both. An example manufacturing process is discussed. Conventional thin film processes, such as solution deposition processes, e.g., spin-coating, and vapor deposition processes, e.g., chemical vapor deposition, may be used for layer deposition. Similarly, conventional patterning processes employed in MEMS and semiconducting fabrication processes, e.g., photolithography, soft lithography and the like, may be used. In step 1, a layer of silicon, which will become the block with the through via and the bottom frame, is prepared.

In step 2, a thin layer of silicon oxide is placed on the top and bottom surfaces of the silicon block, followed by another layer of silicon nitride on top of the silicon nitride layer on both sides. Then the silicon nitride and silicon oxide are removed from one side. In some embodiments, the coatings are applied by chemical vapor deposition (CVD). The highest quality layers may be achieved with low pressure CVD (LPCVD). LPCVD puts films of silicon nitride or silicon oxide on both sides of the wafer. Etching may be used to remove layers from one side of the wafer in order to produce a silicon block with layers on only side. The layers that are to be removed may be removed by conventional silicon micromachining etches. For example, a reactive ion etch or plasma etch may be used to etch off the silicon nitride, and a buffered oxide etch or hydrofluoric acid etch may be used to etch off the silicon oxide. For the buffered oxide etch, photoresist may be applied to the side of the wafer on which the oxide is intended to remain in order to protect it from etching by the buffered oxide etch. Alternatively, in step 2, a thin layer of silicon oxide is placed on one surface of the silicon layer, followed by a thin layer of silicon nitride placed on top of the silicon oxide layer. In step 3, a heater is positioned on top of the silicon nitride block, for example, using beam evaporation or sputtering with a liftoff method. In a typical liftoff process a photoresist is applied on the surface, the photoresist is patterned, and metal is placed on top of the photoresist and wafer surface. This variation allows the metal that lands on top of the surface of the block to be retained when the photoresist is removed. Alternatively, the heater material could also be deposited and covered with an etch-resistant material. The etch-resistant material is patterned so that it covers the parts of the heater material that will form the heater. The uncovered heater material is then etched rather than using a liftoff process.

In step 4, a donut-shaped sealing surface is placed on top of the silicon block. In step 5, the center of the silicon nitride block and silicon oxide block is removed by placing an etch-resistant material on the relevant side of the silicon block, patterning it so that the center is exposed and everything else is covered, and etching the silicon nitride and silicon oxide away at that location. In step 6, an etch-resistant material is applied on the opposite surface of the silicon block. In step 7, the remaining volume of the silicon block is etched away. It could be possible to reverse the order of steps. For example, the step 4 could be performed before the step 3.

In an embodiment, the sealing plate, actuator, and upper frame are made from a piezoelectric material. Laser ablation, water jet, or ultrasonic machining techniques can be used to carve out the portions around the tethers. When the appropriate portions are carved out, the remaining materials form the sealing plate, tethers, and top frame. Then electrodes are removed, for example, by etching or laser ablation around the piezoelectric materials that are designed for actuation. It allows patterning of the electrodes in order to enable application of the necessary voltages. (Assuming that the sheet of piezoelectric material is polarized with the same polarity across the full area of the sheet, different actuating voltages must be applied along the length of the actuating beam to enable it to be actuated as a fixed-guided beam. For example, the voltage may be applied to one end of the actuating beam and not to the other, or voltages with opposite polarities may be applied to the two ends.)

There are alternative methods by which actuating elements are created. An exemplary method is to cut the actuators, central plate, and frame out of a macroscale bilayer sheet of PZT using for example laser cutting. After the PZT sheet is cut to the correct geometry, it may be adhered onto, for example, a silicon frame and a silicon island on which a ring of a material that can be wetted by the seal material has been patterned using microfabrication techniques (such as a nickel layer to be wetted by an indium sealing material.) See, e.g., FIGS. 11A and 11B, which is a cross-sectional cutaway of the resealable valve structure prepared according to this embodiment.

Figure 11A:
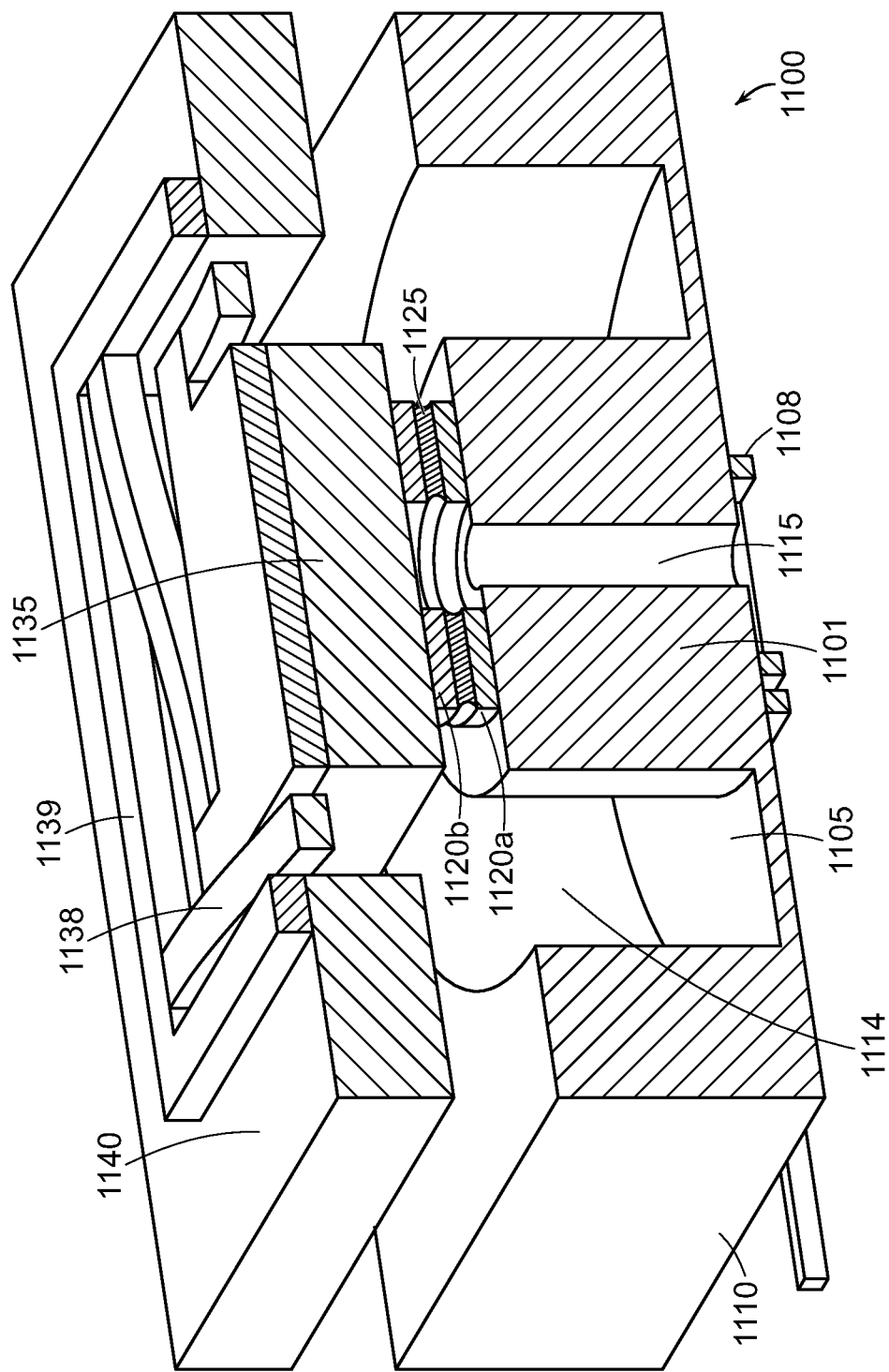
FIG. 11A shows a cross-sectional perspective view of a closed resealable valve in accordance with one or more embodiments in which a piezoelectric actuator is secured to a silicon frame.
Figure 11B:
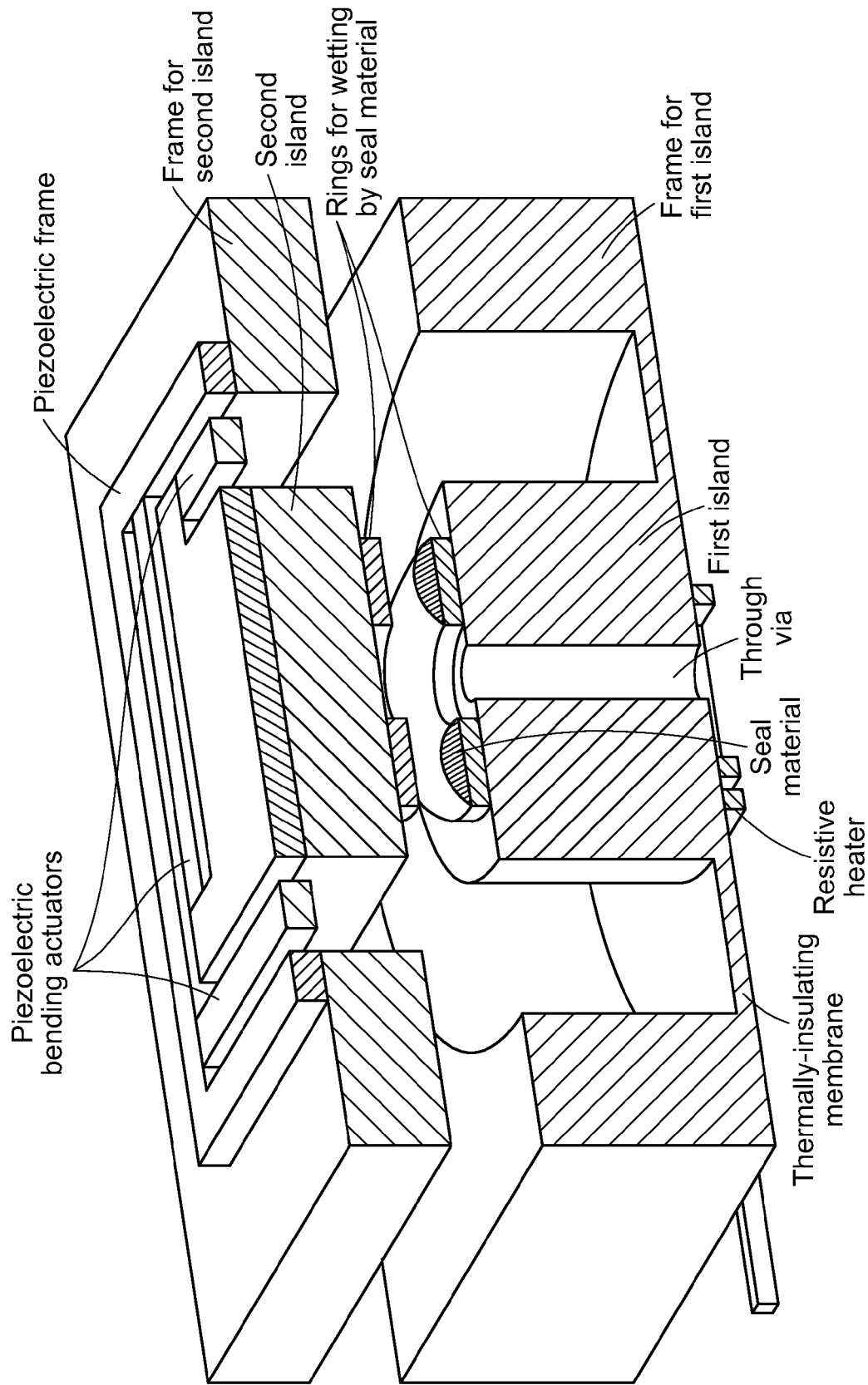
FIG. 11B shows a cross-sectional perspective view of an open resealable valve in accordance with one or more embodiments in which a piezoelectric actuator is secured to a silicon frame.

As shown in FIGS. 11A and 11B, the bottom structure of a resealable microvalve 1100 is same as resealable microvalve 100, but the top structure is different. A piezoelectric frame 1138 is placed on top of an upper frame 1140 and a sealing plate 1135, in which the piezoelectric frame is connected by piezoelectric actuators 1138. By connecting the piezoelectric frame, the actuators connect upper frame 1140 and sealing plate 1135 and move sealing plate 1135 towards and away from block 1101. Alternatively, the actuators can be formed by screen-printing the actuator structure onto the frame.

Sealing Process

The process of sealing resealable microvalve 100 is described. First, the heater 108 provides heat to the sealing material 125 until it melts. Before, during or after the heating step, the actuators 138 connected to the sealing plate 131 are actuated to bring the sealing plate 131 into contact with the (molten) sealing material 125 on the first island. The molten sealing material 125 wets the wetting elements 120 so that it is sealed to both the sealing plate 131 and the block 101. Once there is a ring of sealing material wetting both surfaces, the solid sealing plate blocks flow through the through via 115 of the block 101. The heater 108 is then turned off, solidifying the sealing material 125 and forming a leak-free seal that does not require any further heating or actuation. Finally, the actuators are turned off, as they are no longer needed to hold the block 101 and the sealing plate 131 together. See, e.g., FIG. 7.

Figure 7:
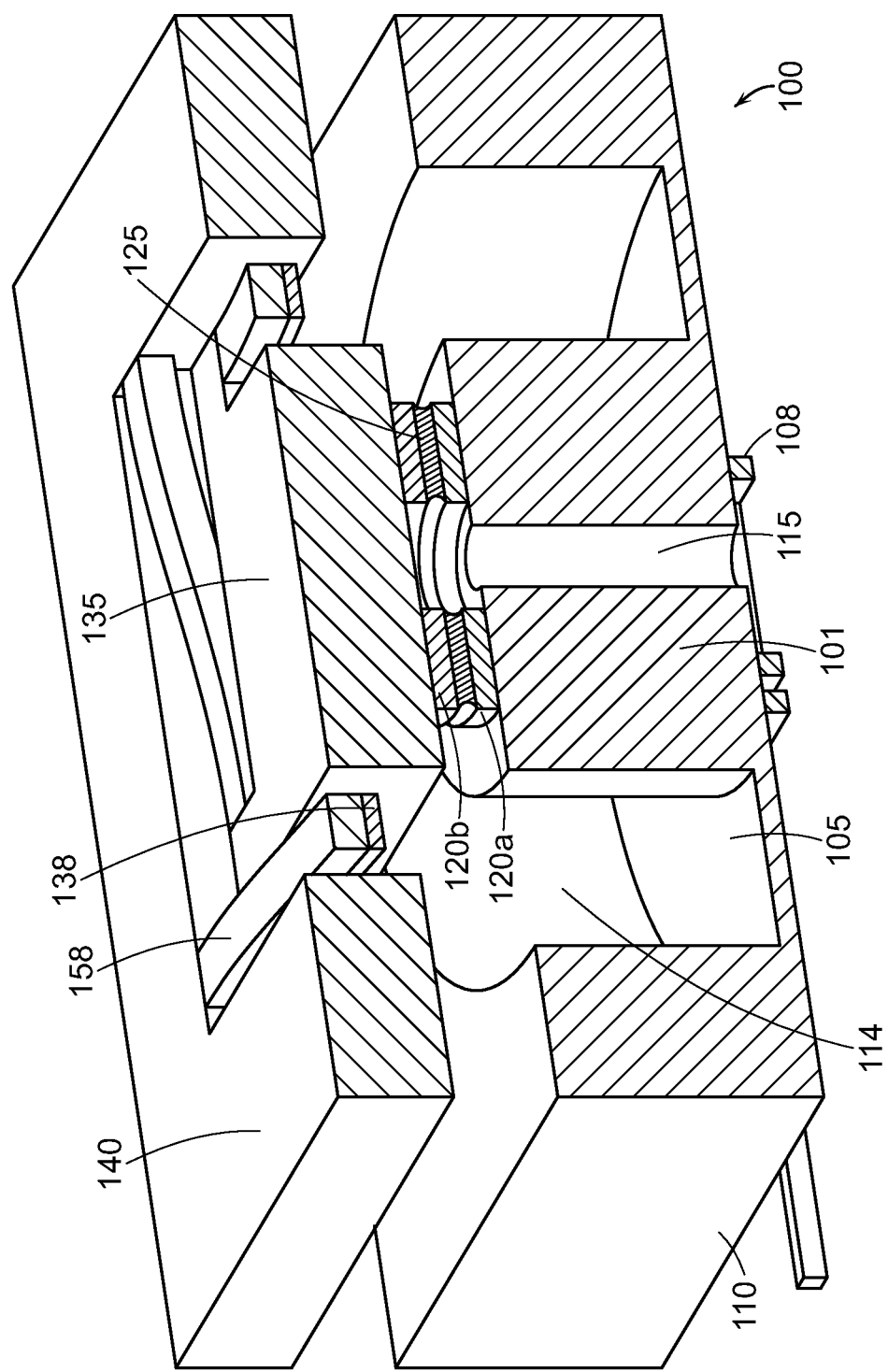
FIG. 7 shows a cross-sectional view of a resealable valve in a sealed configuration in accordance with embodiments of the present invention.

FIG. 7 shows a 3D cross-sectional view of the resealable valve in the closed state in accordance with an embodiment of the present invention. In the closed position, the block 101 and the sealing plate 131 may not be in direct contact with each other, but connected by the sealing material 125.

To reopen the valve, the heater 108 is used to melt the sealing material 125 again. The actuators 138 are actuated in order to separate the block 101 and the sealing plate 131. Then the heater and the actuators are turned off. Alternatively, the two islands may be separated passively, for example, by the spring forces from the tethers and membrane that support the two structures, or by a combination of passive and active actuation. When the two structures are spaced apart, flow passes freely through the through via 115. The valve closing may then be resealed and reopened as described above.

In a piezoelectric actuator, electrodes are placed around the actuator. The electrodes are set to different electric potentials from a source. The electrodes at different electric potentials apply an electric field across the piezoelectric material. As the electric field is applied to the piezoelectric material, the electric field creates a mechanical strain, thus bending the piezoelectric material.

Figure 12:
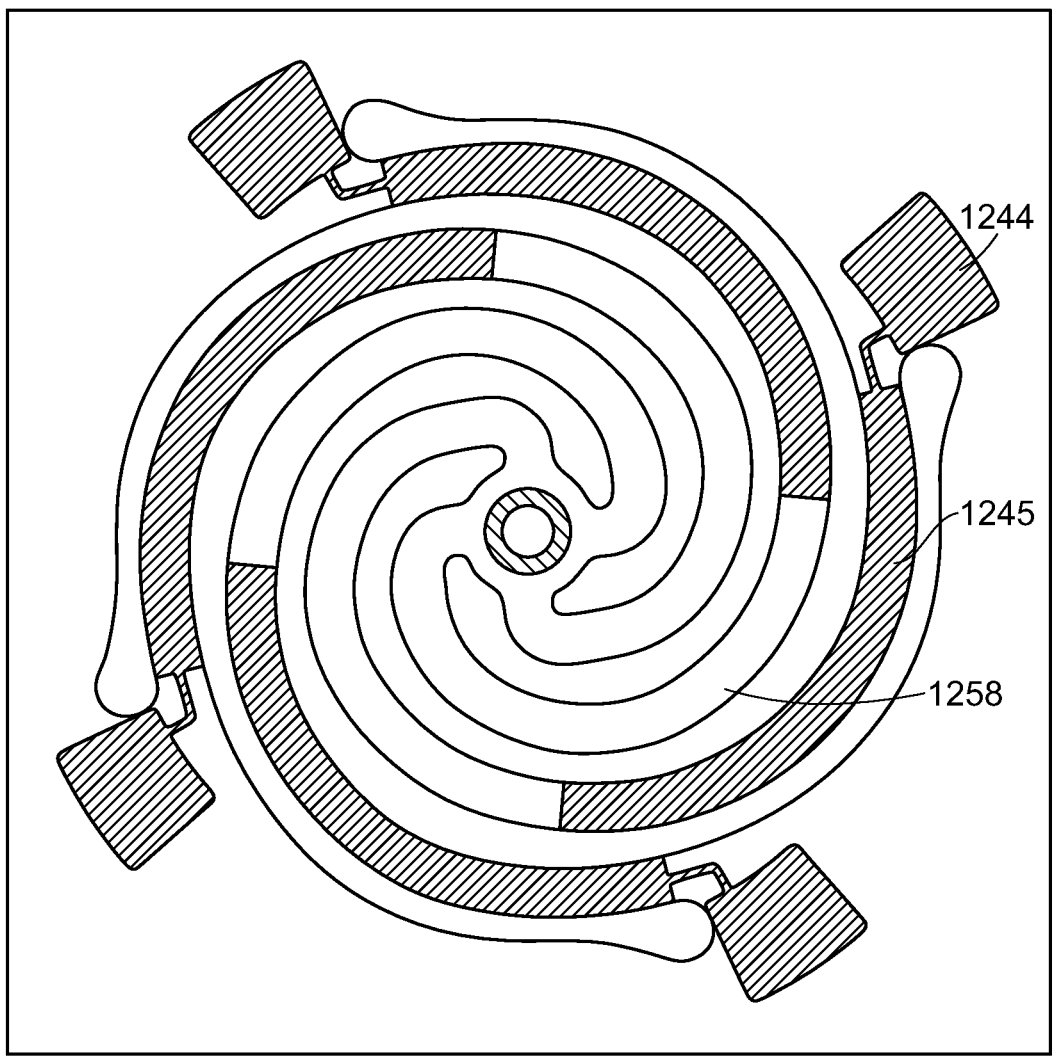
FIG. 12 shows a bottom view of actuators and electrodes in accordance with embodiments of the present invention.

FIG. 12 shows a bottom view of resealable valve, containing piezoelectric actuators. The bottom surface of actuators 1258 is covered with electrodes 1245. Electrodes can cover the entire bottom surface of the actuators or certain portions of the surface. For example, electrodes 1245 of the FIG. 12 cover about half of the actuators. The electrodes can be, for example, made of nickel, copper, alloys of nickel or copper, or other electrically conductive material. At the end of the electrodes, there is an electrical contact pad 1244, which allows electricity to be sent to the electrodes 1245.

FIGS. 13-16 show cross-sectional views across the dashed line 550 of resealable valves, containing 2-layer piezoelectric actuators with different electrode configurations in accordance with embodiments of the present invention. In FIGS. 13-16, actuators and tethers are the same element. Piezoelectric materials have electric polarizations. In a 2-layer piezoelectric actuator, an actuator is x-poled when two layers of the actuator have opposite polarization directions. On the other hand, two layers having the same polarization direction is called a y-poled configuration.

FIG. 13A show x-poled actuators with partially actuating tethers in the open state. The piezoelectric actuators 1338 have two layers of piezoelectric materials, and arrows 1375, which represent the electric polarizations, point towards the center of the actuator. The polarization directions are anti-parallel in the x-poled configuration, as shown in the FIG. 13A. Electrodes 1345b are placed on top of actuators 1358, and electrodes 1345a are placed on the bottom surface of piezoelectric actuators 1338. In an embodiment, electrodes 1345b are connected to ground, and electric field is only applied to electrodes 1345a. As electric potential is applied to electrodes 1345a, outer portions of the tethering actuator are pulled downwards. There also is a connector 1380, which allows proper spacing between the top and bottom structures. Connector 1380 may couple the upper frame and lower frame together. FIG. 13B shows the valve with the same configuration in its closed state.

Figure 14:
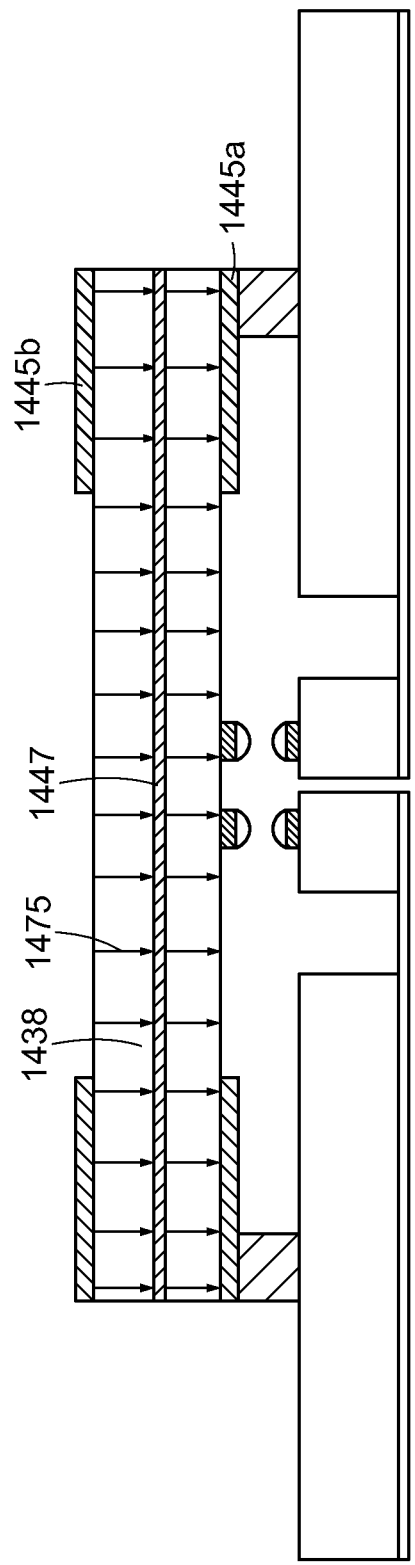
FIG. 14 shows a cross-sectional view of a resealable valve, containing y-poled piezoelectric actuators with partially actuating tethers in accordance with embodiments.
Figure 15:
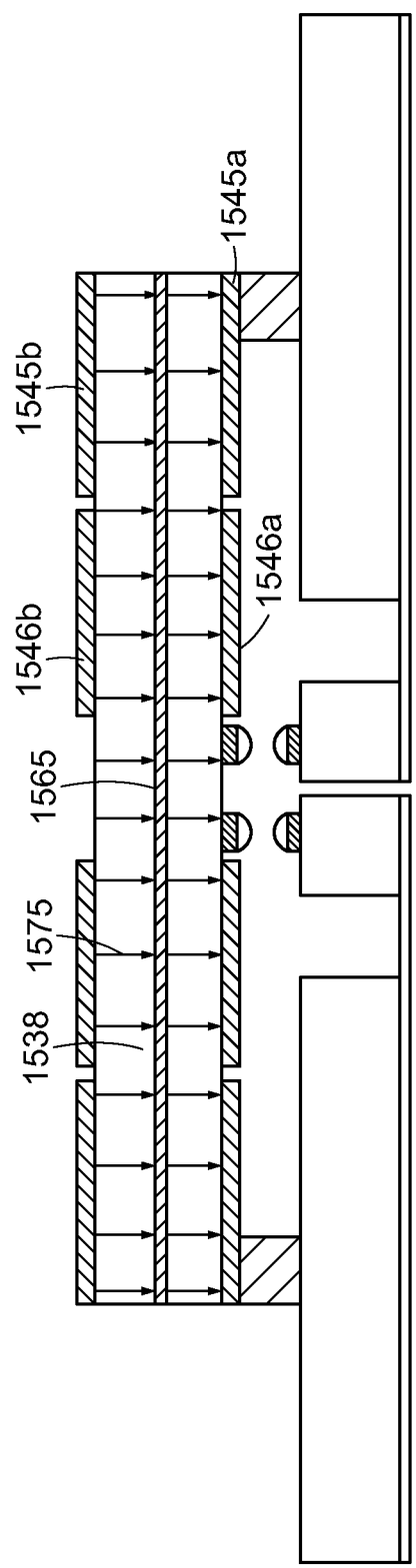
FIG. 15 shows a cross-sectional view of a resealable valve, containing x-poled piezoelectric actuators with fully actuating tethers in accordance with embodiments.

FIG. 14 shows y-poled actuators with partially actuating tethers. Arrows 1475 shows that the polarizations of the two layers are parallel to each other. Between the two layers, there is a layer of electrode 1447. Electrode layer 1447 may be connected to ground. In addition, there are electrodes 1445a and 1445b on the outer portions of the piezoelectric actuators 1438. These electrodes allow the actuators deflect downwards.

Figure 16:
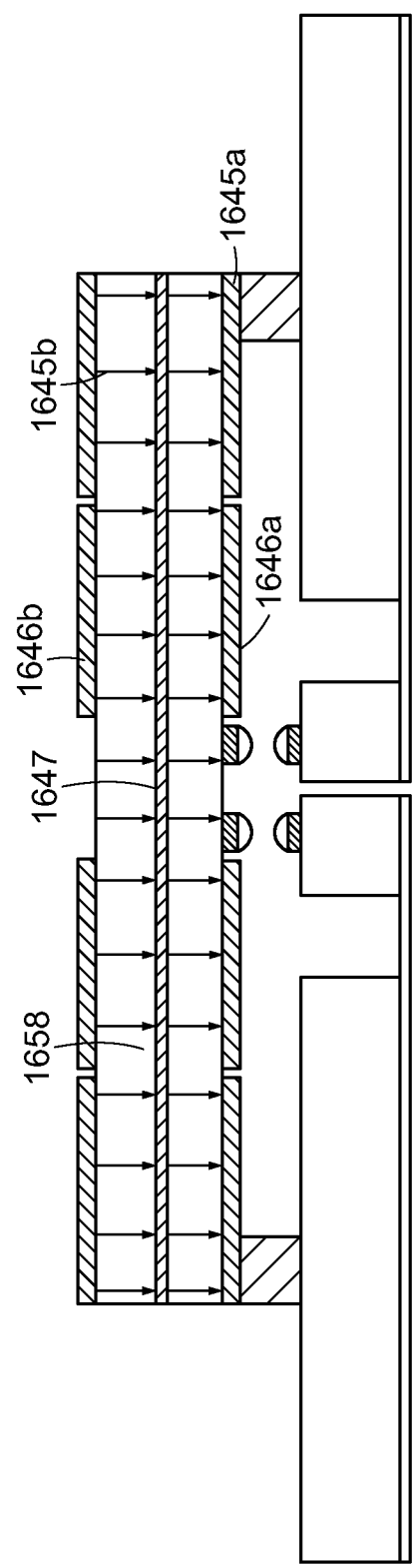
FIG. 16 shows a cross-sectional view of a resealable valve, containing y-poled piezoelectric actuators with fully actuating tethers in accordance with embodiments.

In a configuration with fully actuating tethers, electrodes cover the entire or majority of both bottom and top surfaces of the actuators. For example, the bottom surface is covered with electrodes 1545a and 1546a and the top surface is covered with electrodes 1545b and 1546b in FIG. 15. In an embodiment, electrodes 1545a and 1546b can be connected to ground, and electric field can be applied to 1545b and 1546a. Electric potential across electrodes 1545b pushes the outer portion of the actuator downwards, and electric potential across electrode 1546a pushes the inner portion of the actuator upwards. Similarly, FIG. 16 shows electrodes 1645a and 1646a covering the bottom surface of the 2-layer piezoelectric actuators and electrodes 1645b and 1646b covering the top surface. Electrodes 1647 are connected to ground and electric field is applied to the electrodes on the top and bottom surfaces.

Alternative Embodiments

In alternative embodiments, the functional elements can be modified to create different structures with the same basic functionality. FIGS. 1-7 describe an embodiment in which the lower block is supported on a membrane. The membrane is integrated into the device requiring the seal and prevents flow around the seal. If, instead of the membrane, both the sealing plate and the block are supported on tethers, liquid or gas could leak through the gap created by the tethers. Thus, either the block or the sealing plate is supported on a substantially leak-free structure (e.g., a membrane) such that fluid only flows through the through via (or the orifice). The membrane can either support the sealing plate or the block, while the other is on a tethered structure. Alternatively, one membrane can support the sealing plate and another membrane can support the block.

In an embodiment, the sealing material is located on one of the two islands or both islands; after the first sealing cycle, it is located on both, but it needs not start out that way. In alternative embodiments, a heater is on only one island or on both islands.

In alternative embodiments, the tether structure may be replaced by a cantilever structure or a membrane structure or other structure that provides a flexible support. The actuators can be connected to the block that has the through via or to the sealing plate. The sealing plate can be an island supported on a membrane or tethers as described above, or it could be a membrane or cantilever in its own right.

Figure 8:
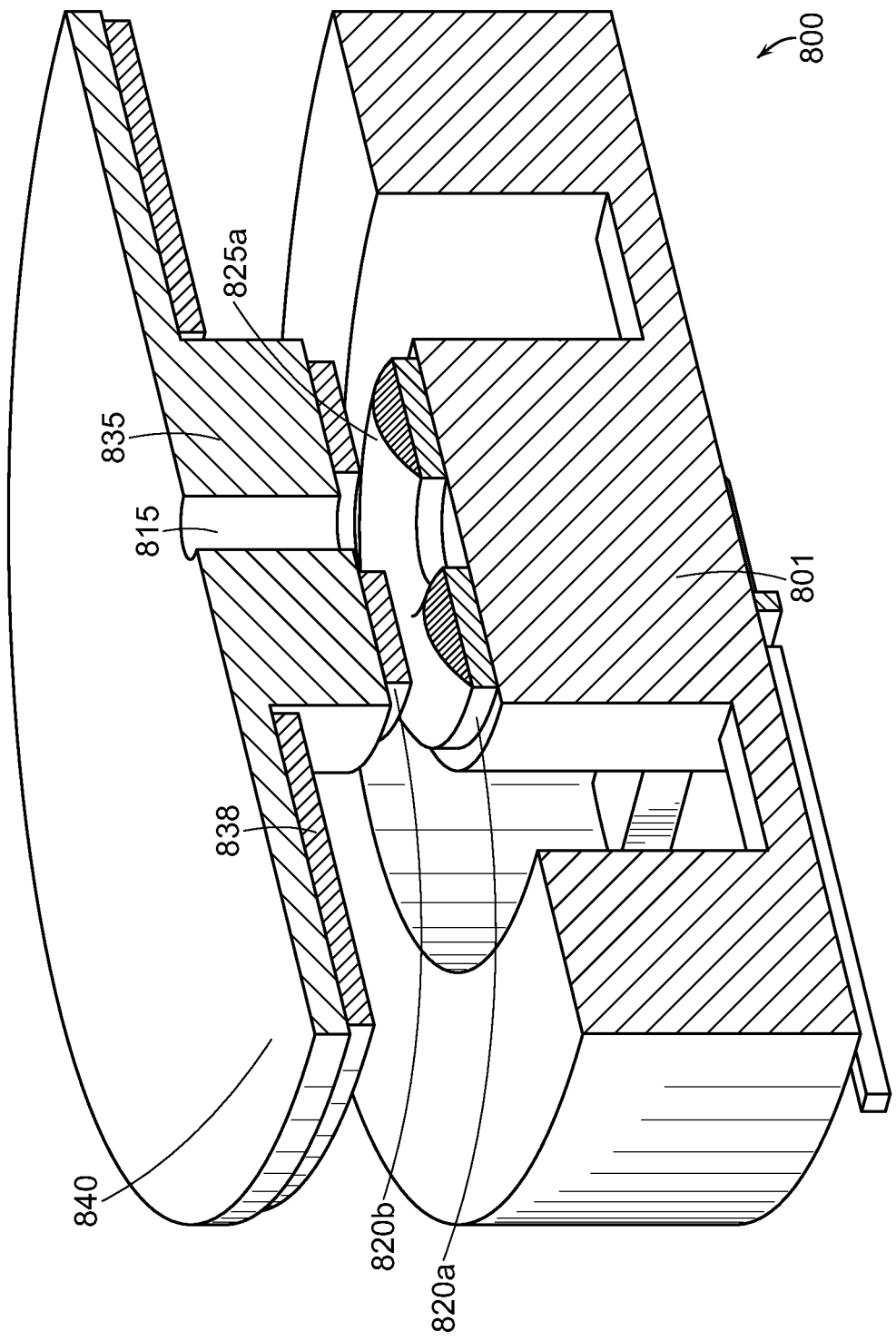
FIG. 8 shows a cross-sectional view of a resealable valve having a membrane supported on a tethered structure without a frame in accordance with embodiments of the present invention.

FIG. 8 shows an alternative embodiment of resealable microvalve 800. Resealable microvalve 800 has a block 835 with a through via 815 supported on a membrane 840. In an embodiment, piezoelectric actuators 838 are placed on the entire surface of membrane 840. Thus, the entire membrane 840 deflects towards and away from a sealing block 801. In this embodiment, a sealing block 801 is connected to a lower frame 810, leaving space 814 between them. As shown in FIG. 8, there may not exist a membrane connecting the sealing block and the lower frame because membrane 840 already provides a leak-proof structure. Fluid may not flow through anywhere else except the through via.

Similar to the wetting elements of resealable valve 100, wetting elements 820a and 820b are located on sealing block 801 and block 835. A sealing material 825a can have a wetting interaction with the wetting elements and a non-wetting interaction with the surrounding sealing block and block.

Figure 9:
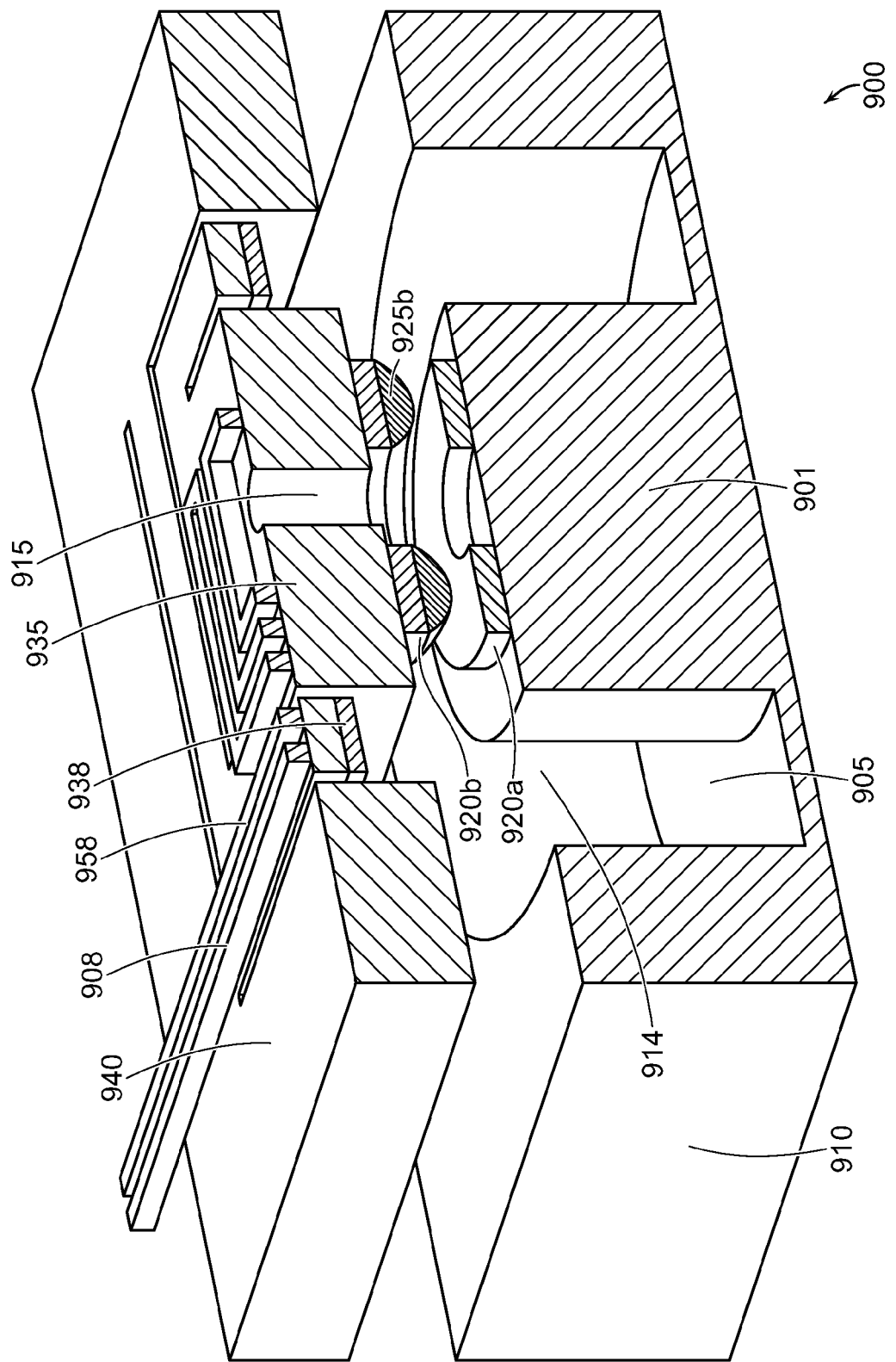
FIG. 9 shows a cross-sectional view of a resealable valve having actuators, a heater and a through via on a tethered plate in accordance with embodiments of the present invention.

FIG. 9 shows a cross-sectional view of another embodiment of a resealable microvalve 900. A heater 908 and a through via 915 are placed on a tethered block 935. Actuator 138 moves tethered block 935 towards and away from sealing block 901. In this embodiment, suitable materials for heater 908 have their failure stresses larger than the stresses to which the heater will be exposed when actuated.

A resealable valve 900 includes a block 935 with a through via 915. Block 901 is supported on tethers 938, which are connected to an upper frame 940. Actuators 958 are placed under tethers 938, but it can also be placed on top of the tethers. The resealable valve also includes a sealing block 901 positioned in facing relationship with block 935. A wetting element 920b surrounds through via 915, and a sealing material 925b is disposed on the wetting element 920a. On the opposite side of block 935, a heater 908 for providing heat to the sealing material is located.

Sealing block 901 also includes a wetting element 920a, which can be made of the same or different material as wetting element 920b and can be in the same or different shape as wetting element 920a. The wetting element 920a faces the wetting element 920b of block 935. The sealing block 901 is supported on membrane 905, connected to a lower frame 910. Between sealing block 901 and lower frame 910, there exists a space 914 for thermal insulation.

Figure 10:
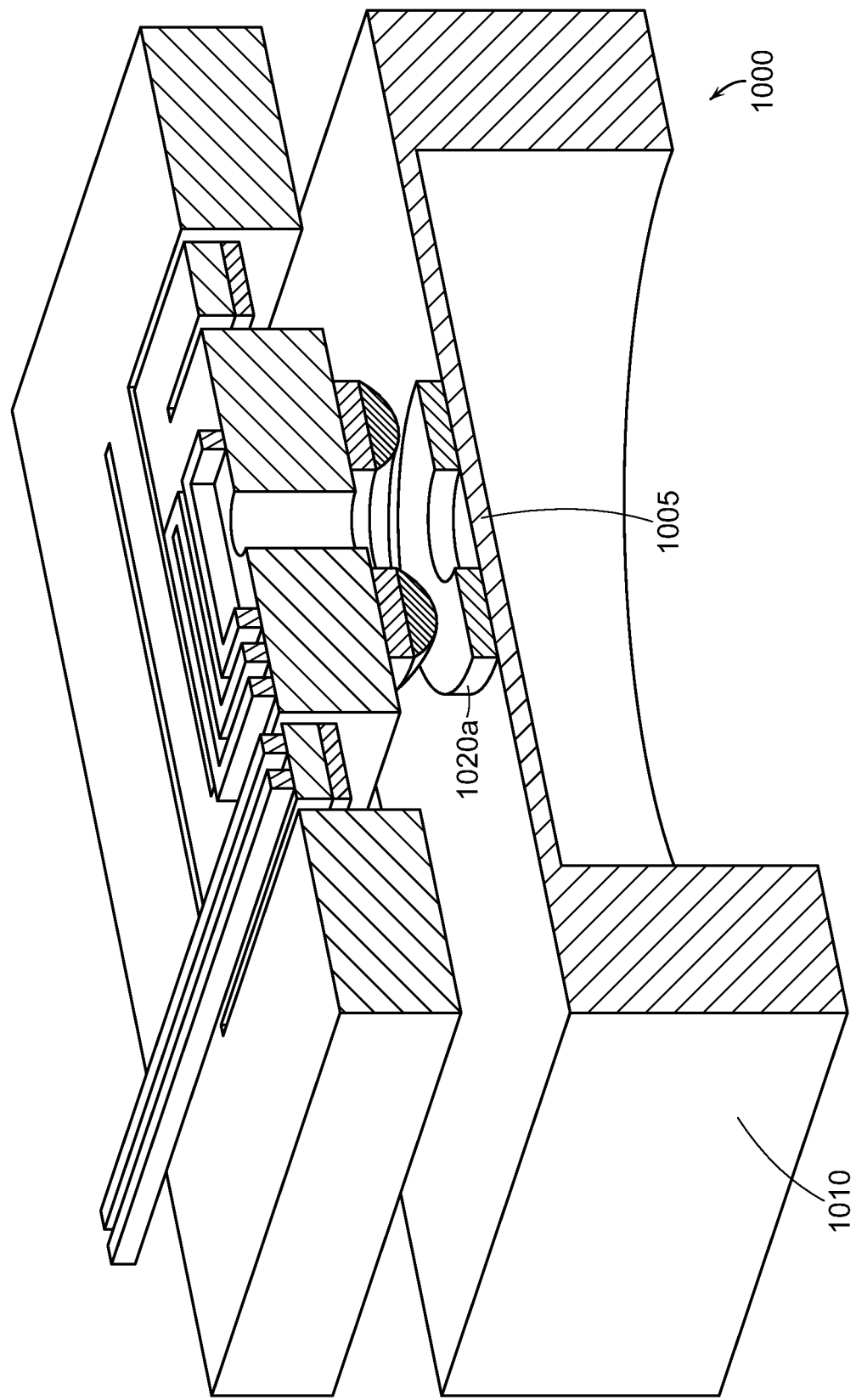
FIG. 10 shows a cross-sectional view of a resealable valve where a through via is sealed by a membrane in accordance with embodiments of the present invention.

FIG. 10 shows yet another embodiment in which a through via is sealed by a membrane. Similar to FIG. 9, a heater and a through via are located on tethered block. However, the through via is sealed by a sealing membrane 1005, rather than by a sealing block supported on a membrane and a frame. Sealing membrane 1005 is connected to a lower frame 1010, and a wetting element 1020a is disposed on top of the sealing membrane.

Potential Applications

This technology has many applications as a key enabling component of accurate, portable sensor systems. Innovations in MEMS technology have enabled the sensing of chemical or biological species using much more compact sensors than have ever been possible before. Portable sensors that can monitor and identify chemical and biological species are applicable to homeland security, the military, health care, life sciences, manufacturing, etc. For example, a mass spectrometer might monitor for toxins or biological threats in public spaces.

However, these sensors face a substantial technological hurdle. Many of these micro sensor systems require vacuum inside the device to operate properly, and microscale vacuum pump technology is very limited. In fact, achieving the type of vacuum that many of these sensors require usually involves using a macroscale vacuum pump, which negates the purpose of a portable sensor system. The leak-free, resealable valve disclosed here is a key enabler of high performance microscale vacuum systems, and therefore is also a key enabler for these types of sensor systems that require portable vacuum. Beyond sensor systems, these valves also play a key role in enabling other systems that require high vacuum, such as chip scale atomic clocks for military and navigational purposes.

The resealable, leak-free microvalve technology was originally conceived in the context of vacuum micropumps. That research focuses on creating systems that include a low vacuum pump (such as a MEMS displacement pump, currently able to reach on the order of 100 Torr) and a high vacuum pump (such as a MEMS ion pump or a sorption pump) to complete the evacuation of the partially evacuated space of interest. Since high vacuum pumps cannot work well in the presence of leakage flows, the resealable valve is necessary to prevent leakage from the low vacuum pump to the high vacuum space while still allowing the connection to be opened when larger amounts of gas need to be pumped out by the displacement pump.

A resealable microvalve can also be used to measure the atmospheric composition of the Earth. A resealable microvalve may be sent to a higher altitude, for example in an air balloon, collect the air, be sealed and brought down to the ground level. The resealable microvalve can then be opened in a laboratory for the study of atmosphere. See, e.g., *A materials investigation of a phase-change micro-valve for greenhouse gas collection and other potential applications* by Manginell et al.

As will be apparent to one of ordinary skill in the art from a reading of this disclosure, the present disclosure can be embodied in forms other than those specifically disclosed above. The particular embodiments described above are, therefore, to be considered as illustrative and not restrictive. Those skilled in the art will recognize, or be able to ascertain, using no more than routine experimentation, numerous equivalents to the specific embodiments described herein. The scope of the invention is as set forth in the appended claims and equivalents thereof, rather than being limited to the examples contained in the foregoing description.

What is claimed is:

1. A resealable microvalve comprising:
    first and second plates in facing relationship, wherein at least one of the first and second plates is capable of movement from a first spaced apart position to a second contacting position, the first plate comprising a through via;
    a first wetting element disposed on the first plate and surrounding the through via;
    a second wetting element disposed on the second plate in facing relationship with the first wetting element;
    a sealing material disposed on one or both of the first and second wetting elements, the sealing material capable of reversible melt and solidification and of wetting the first and second wetting elements when in a molten state; and
    a heating element in thermal communication with the sealing material, wherein the heating element is positioned on at least one of the first and second plates;
    wherein at least one of the first and second plates is supported on a leak-proof structure;
    wherein a surface of the first plate surrounding the first wetting element has a non-wetting interaction with the sealing material, and
    wherein a surface of the second plate surrounding the second wetting element has a non-wetting interaction with the sealing material.

2. The microvalve of claim 1, wherein the heating element comprises a resistive heater.

3. The microvalve of claim 1, wherein the first plate is supported on a thermally insulating membrane.

4. The microvalve of claim 3, wherein the first plate is at least partially surrounded by a thermal insulator.

5. The microvalve of claim 4, wherein the thermal insulator is air or a thermally insulating material.

6. The microvalve of claim 1, further comprising an actuator for moving the first and second plates between the first spaced apart position and the second contacting position.

7. The microvalve of claim 6, wherein the actuator is piezoelectric, electromagnetic, electrostatic, or thermopneumatic.

8. The microvalve of claim 7, wherein the piezoelectric actuator comprises electrodes covering a portion of the actuator.

9. The microvalve of claim 6, wherein the actuator is supported on thermally insulating tethers.

10. The microvalve of claim 6, wherein the actuator is coupled to the second plate and the heating element is placed on a surface of the first plate.

11. The microvalve of claim 10, wherein the first plate is comprised of a thermally conducting material.

12. The microvalve of claim 6, wherein the second plate is supported on a thermally insulating membrane.

13. The microvalve of claim 12, wherein the second plate is at least partially surrounded by a thermal insulator.

14. The microvalve of claim 13, wherein the thermal insulator is air or a thermally insulating material.

15. The microvalve of claim 12, wherein the first plate is supported on a thermally insulating membrane and the actuator is coupled to the thermally insulating membrane.

16. The microvalve of claim 12, wherein the actuator is coupled to the first plate and the heating element is placed on the surface of the first plate.

17. The microvalve of claim 12, wherein the second plate is a thermally insulating membrane.

18. The microvalve of claim 1, further comprising:
    first and second frames supporting the first and second plates; and
    a connector coupling the first and second frames.

19. A method of sealing a resealable microvalve, the method comprising:
    providing a resealable microvalve according to claim 1;
    heating the sealing material to melt the sealing material;
    moving the first and second plates from the first spaced apart position to the second contacting position, wherein the molten sealing material wets the surfaces of the first and second wetting elements to form a molten seal; and
    cooling the molten seal to resolidify the sealing material and forming a gas-tight seal.

* * * * *